United States Patent [19]
Colibert

[11] Patent Number: 5,246,244
[45] Date of Patent: Sep. 21, 1993

[54] CONCEALED FRAME MOUNTED HITCH ASSEMBLY

[76] Inventor: Floyd A. Colibert, 2995 W. 6620 South, West Jordan, Utah 84084

[21] Appl. No.: 800,445

[22] Filed: Nov. 26, 1991

[51] Int. Cl.$^5$ .............................................. B26D 1/52
[52] U.S. Cl. ................................. 280/495; 280/433; 280/491.5; 280/511; 280/901
[58] Field of Search ........... 280/495, 901, 511, 491.5, 280/433, 491.1

[56] References Cited

U.S. PATENT DOCUMENTS

| | | | |
|---|---|---|---|
| 3,659,876 | 5/1972 | Melton | 280/901 |
| 3,796,444 | 3/1974 | Hixon | 280/901 |
| 4,921,266 | 5/1990 | Beals | 280/901 |
| 5,143,393 | 9/1992 | Meyer | 280/901 |
| 5,145,199 | 9/1992 | Howard | 280/495 |

*Primary Examiner*—Margaret A. Focarino
*Assistant Examiner*—Kevin Hurley

*Attorney, Agent, or Firm*—Thorpe, North & Western

[57] ABSTRACT

A trailer hitch assembly for installation to the frame or chassis of a pick-up truck and for use with a gooseneck trailer is herein provided, the trailer hitch assembly comprising a detachable ball hitch including a stem attached at one end thereof, a mounting frame which includes means for attaching the mounting frame to the chassis of the truck, and receiving means for securing the stem of the ball hitch to the mounting frame, and integrated locking means for locking the stem of the ball hitch in the receiving means in an operative, locked position. This invention provides the distinct advantage of using integrated locking means which do not include a lock washer, such that the tendency of the lock washer to rip and tear the mounting plate with continued tightenings and loosenings is obviated. The hitch assembly is completely concealed when not in use, leaving the truck bed with a flush floor.

11 Claims, 6 Drawing Sheets

CONCEALED FRAME MOUNTED HITCH ASSEMBLY

BACKGROUND OF THE INVENTION

1. Field

This invention relates generally to trailer hitches and more specifically to a novel apparatus for mounting on the frame of a pick-up truck whereby a trailer having a standard gooseneck attachment is facilely connected to a ball hitch which is attached thereto in the bed of the pick-up truck.

2. Prior Art Trailer hitch assemblies are widely used to temporarily connect, in rotatable fashion, a trailer to a lead vehicle which supplies directional and driving capabilities. Trailers are known to provide a variety of advantages, perhaps most noteworthy of which is a marked increase in storage capacity of the lead vehicle.

While a number of different devices and related methods are known whereby a hitch ball or other hitch coupling is connected to the lead vehicle, many larger trailers are equipped with what has become known in the industry as a gooseneck assembly. A gooseneck assembly typically comprises an extended, crooked neck which extends into the bed of the pick-up truck, the free end of the neck including a ball receiving locking mechanism. In the bed of the truck, near the center thereof, a ball hitch assembly is mounted. Generally, this ball hitch is mounted only by means of a mounting plate, or similar, which is securely attached, usually by bolting to the bed of the truck.

While in many cases this assembly is suitable, the weight of a large, heavy trailer tends to place undue stress on the mounting plate, often resulting in a failure of the ball attachment to the bed of the truck. Of course, such a risk of failure is dangerous and therefore unacceptable.

An advantage is provided when the mounting plate to which the ball hitch is secured is secured to the frame of the truck. This has shown to be a more effective and safe way to attach the ball hitch to the truck bed. However, problems still arise from this arrangement. For example, it is often desirable to remove the ball hitch from its mounted position in the bed of the truck to otherwise use the bed of the truck such as for cargo storage. When the ball hitch is removed on a regular basis for such purposes the securing parts become worn and as a result fail to function as required.

Furthermore, jostling and jarring in the normal course of traveling with a gooseneck trailer similarly tends to wear on the ball hitch assembly, thus causing a decrease in effectiveness. As a result, ball hitch assemblies often must be replaced after a relatively short period of time or after a relatively few number of miles, which can be unduly expensive.

Therefore, it would serve a legitimate interest in the art to create a ball hitch assembly which can easily be removed from the mounting plate which secures it firmly to the frame of the truck and similarly replaced. Also, it would be advantageous to provide such a ball hitch assembly which may be secured to the mounting plate without the standard locking mechanism, usually a lock washer, so as to prevent the wearing of parts.

BRIEF SUMMARY AND OBJECTS OF THE INVENTION

Accordingly, it is a principal object of the present invention to provide a ball hitch assembly which may be secured to a mounting plate without the use of a standard lock washer.

It is a further important object of the invention to provide a ball hitch assembly wherein the ball hitch may be installed and removed facilely and efficiently.

It is still another principal object of the invention to provide a ball hitch assembly which attaches to the frame of the truck which is to pull the trailer connected by the ball hitch assembly.

Another major object of the invention is to provide a ball hitch assembly which is relatively inexpensive, easy to install, long lasting, efficient, durable, and which provides structural strength.

These and other objects and features are found in the preferred embodiment of the present invention which comprises generally a detachable ball hitch including a stem, a mounting frame which includes means for attaching the mounting frame to the frame or chassis of a truck and receiving means for securing the stem of the ball hitch to the mounting frame, and finally integrated locking means for locking the stem of the ball hitch in the receiving means in an operative, locked position. Advantageously, the stem includes leveraging means for tightening the stem in the receiving means in the operative, locked position, and for loosening the stem from the receiving means upon disassembly. Preferably, the leveraging means includes an aperture for receipt of one end of the lever, the aperture disposed such that the ball hitch acts as a fulcrum when a force is applied to the other end of the lever. Preferably, the integrated locking means comprises an integrated annular ring disposed at one end of the ball hitch such that when the ball hitch is received in the receiving means, the integrated annular ring is the only portion of the ball hitch which is contacting the top flat face of the mounting frame. The complete hitch parts left in the truck when not in use are concealed beneath the truck bed floor.

BRIEF DESCRIPTION OF THE DRAWINGS

In order that the manner in which the above recited and other advantages and objects of the invention are obtained can be appreciated, a more particular description of the invention briefly described above will be rendered by reference to a specific embodiment thereof which is illustrated in the appended drawing. Understanding that these drawings depict only a typical embodiment of the invention and are not therefore to be considered limiting of scope, the invention will be described and explained with additional detail through the use of the accompanying drawings in which.

DETAILED DESCRIPTION OF THE PREFERRED EMBODIMENTS

Figure 1:
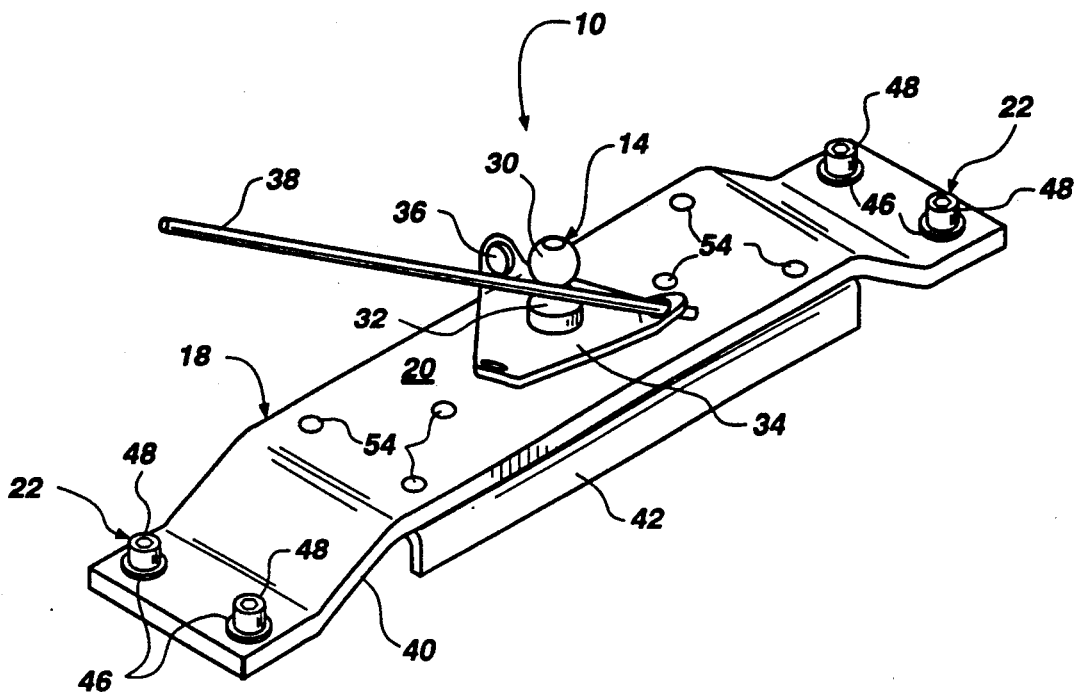
FIG. 1 is a perspective view of an example of a ball hitch assembly according to the invention.

Reference will now be made to the drawings wherein like structures will be provided with like reference designations. Referring first to FIGS. 1–6, a preferred device 10 for installation in the bed of a pick-up truck 12 and for use of a gooseneck trailer, not shown, comprising a detachable ball hitch 14, which includes a stem 16 attached at one end thereof and a mounting frame 18 having a top flat face 20. The hitch is completely concealed when not in use, and nothing extends above the bed floor surface when not in use leaving the truck bed fully useful.

The preferred ball hitch is standard in the industry except for a few modifications which will be explained. Generally, the ball hitch 14 includes, besides the stem 16, a ball 30 which is attached to a trailer in a standard manner, and a shank portion 32.

Figure 5:
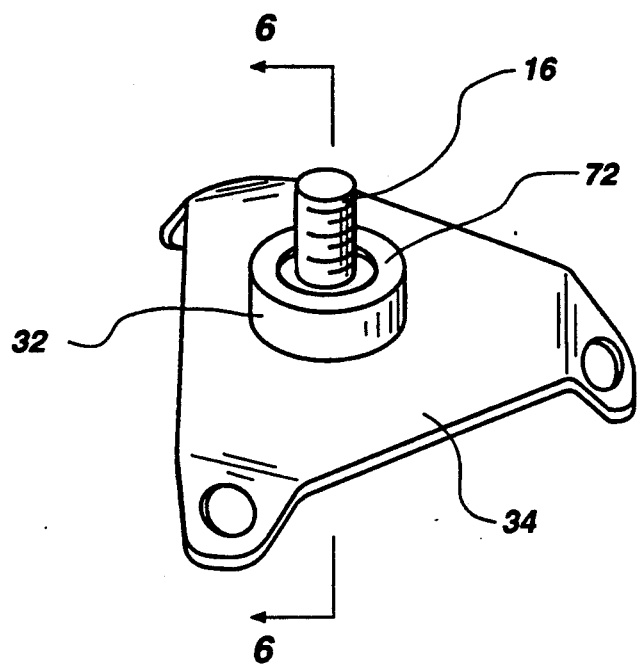
FIG. 5 is an isolated perspective view, from below, of the ball hitch and stem of the ball hitch assembly of FIG. 1 illustrating the integrated annular ring.
Figure 6:
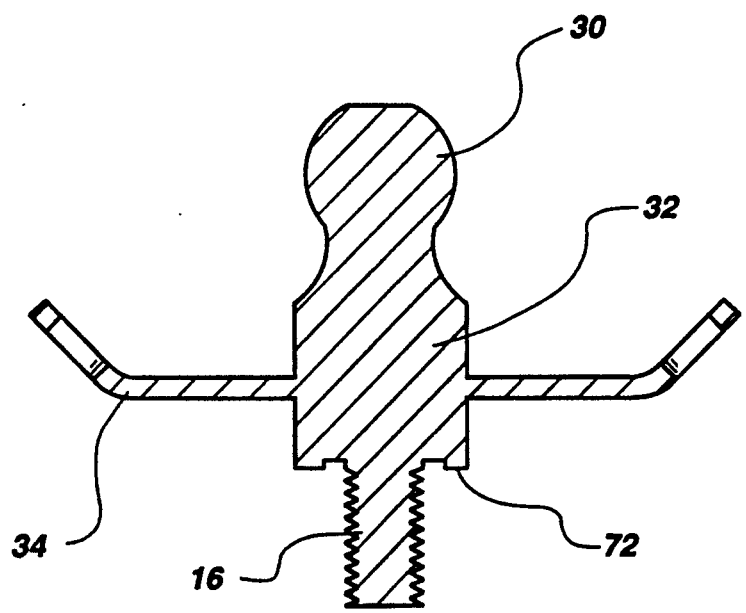
FIG. 6 is a cross-sectional view taken along the lines 6—6 of FIG. 5 and inverted.

As seen particularly in FIGS. 5 and 6, the stem 16 and ball 30 are attached at opposing ends of the shank portion 32, both components being integrally attached thereto The stem 16 is threaded for reasons which will be explained hereafter. To the shank portion 32 is secured, by welding or other suitable means, a triangular plate 34. As shown, each corner of the plate 34 is turned upwardly at an angle of about 45 degrees from the plane formed by the middle portion of the triangular plate 34. Each upwardly turned corner of the plate 34 includes an aperture 36. In use, one end of a lever 38 is inserted through an aperture 36, a portion of the lever 38 abutting against the shank portion 32 of ball hitch 14 (FIG. 1). In this configuration, the ball hitch 14 acts as a fulcrum when a force is applied to the other end of the lever, thereby facilitating tightening and loosening of the ball hitch 14 when installed and removed, respectively. One skilled in the art will recognize that such a configuration serves as leveraging means used for the above stated purposes, although it will also be recognized that any number of leveraging means may be substituted therefor.

Figure 2:
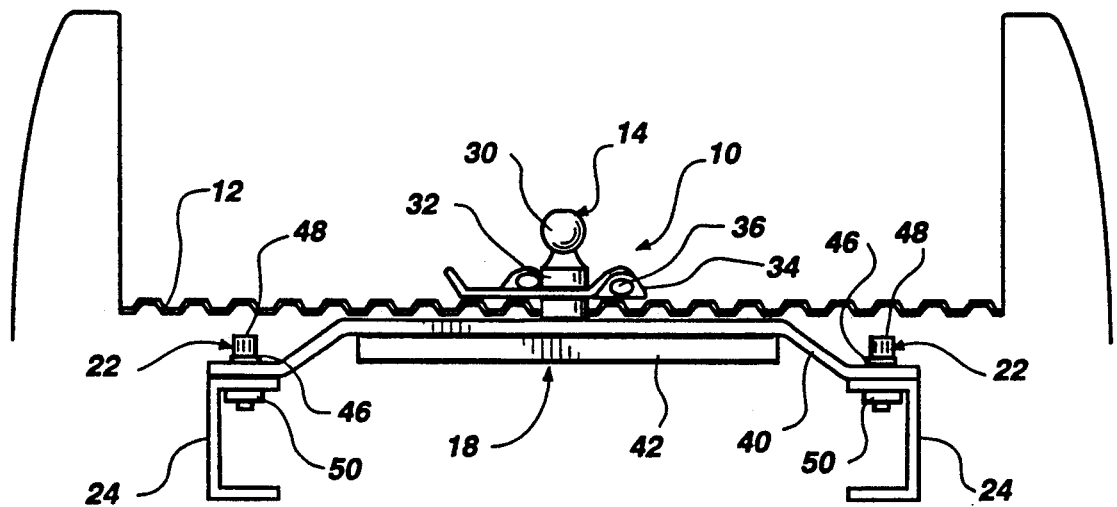
FIG. 2 is a front elevational view of the ball hitch assembly of FIG. 1 shown mounted to a truck.
Figure 3:
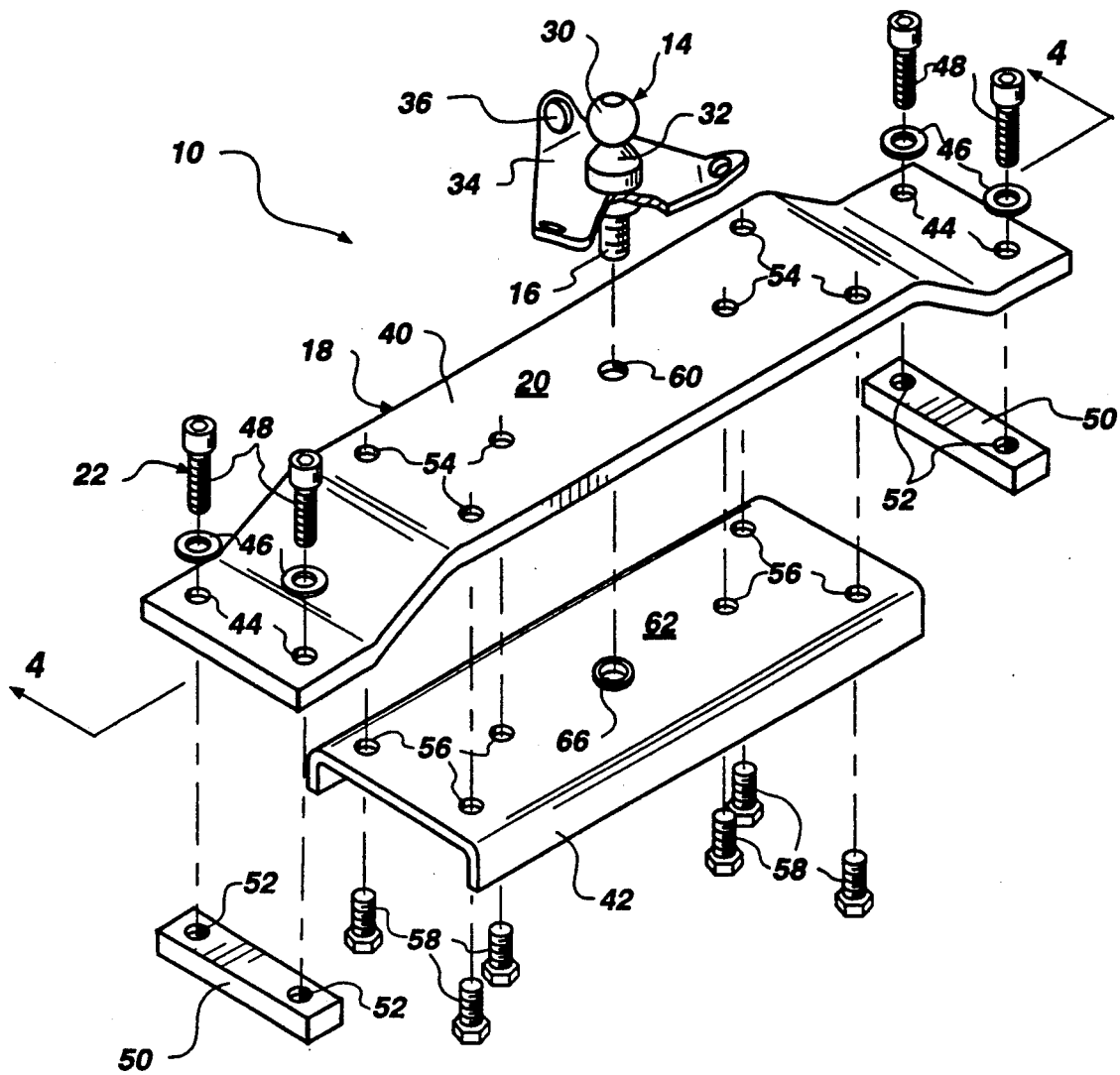
FIG. 3 is an exploded perspective view of the ball hitch assembly of FIG. 1.

The mounting frame 18 comprises essentially a top plate 40 which includes the top flat face 20, and a C-channel 42 which gives structural integrity to the mounting frame 18. As seen most clearly in FIGS. 1–3, the top plate 40 includes at opposing longitudinal ends a pair of apertures 44 through which bolts 48 pass (as well as through washers 46). Each bolt 48 also passes through the frame or chassis 24 of the truck 12 (FIG. 2). A retainer plate 50 which includes threaded apertures 52 receives the bolts 48 after passing through the chassis 24, thereby allowing the bolts 48 to be tightened to secure the mounting frame 18 in place. The top plate 40 includes a plurality, preferably six, of apertures 54 which may be correspondingly aligned with similar apertures 56 in the C-channel 42. The appropriate number of bolts 58 pass through aligned apertures 54 and 56 and are tightened to securely attach top plate 40 and C-channel 42 together. The bolts 58 are preferably of a length so as to be approximately flush with the top flat face 20 of the top plate 40 when inserted. The top plate 40 further includes an aperture 60 drilled or otherwise formed through approximately the center thereof to receive the stem 16.

Figure 4:
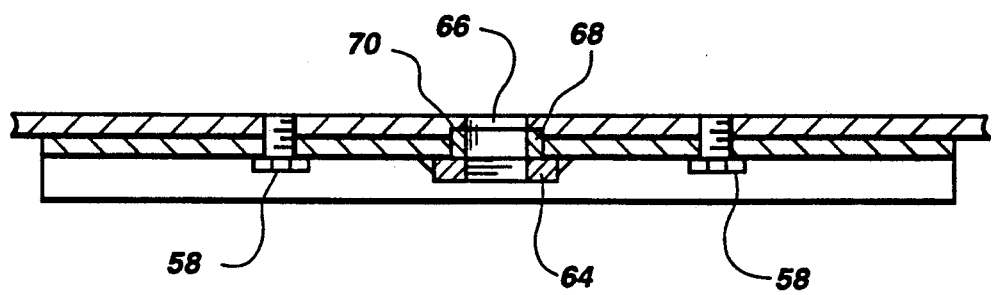
FIG. 4 is a partial front elevational view of the mounting plate of the ball hitch assembly of FIG. 1, taken along the lines 4—4 of FIG. 3.

The C-channel 42 includes an interior face 62 to which a large nut 64 is welded. An aperture 66 in the C-channel 42 is lined by a ring 68 which is securely attached thereto. The ring 68, as best seen in FIG. 4, has a height greater than the thickness of the C-channel 42, the top plate 40 including an appropriate recess 70 to receive the ring 68 such that the top plate 40 and the C-channel 42 may be connected flush together. Still referring to FIG. 4, the large nut 64, the ring 68, and the aperture 60 in the top plate 40 have an identical interior diameter and are integrated and threaded together such that the stem 16 of the ball hitch 14 is received therein. One skilled in the art will recognize that the large nut 64, the ring 68, and the aperture 60 combined together form receiving means for securing the stem 16 of the ball hitch 14 to the mounting frame 18. Other receiving means are also contemplated and fall within the purview of this invention.

Referring again to FIGS. 5 and 6, an integrated annular ring 72 is formed about and is integral with the end of shank portion 32 of ball hitch 14 from which the stem 16 extends. The integrated annular ring 72 is disposed such that when the ball hitch 14 is received in the receiving means, the integrated annular ring 72 is the only portion of the ball hitch 14 which contacts the flat face 20 of the mounting frame 18. This configuration accomplishes the same purpose as a lock washer, in that the ball hitch 14 is secured in the receiving means, however, this configuration has fewer parts, which parts do not tend to rip and tear at the top plate 40 or the shank portion 32, thus prolonging the life of the device 10. One skilled in the art will recognize that the integrated annular ring 72 serves as integrated locking means. It is also to be recognized that other integrated locking means may be used instead of the integrated annular ring 72. Such other replacement components include a lock washer.

Figure 7:
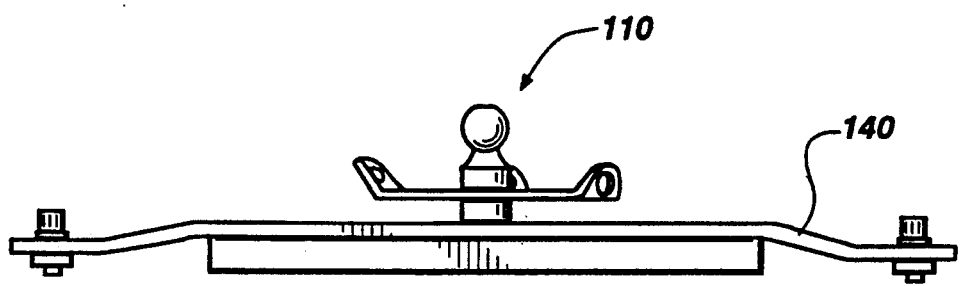
FIG. 7 is a front elevational view of another example of a ball hitch assembly according to the present invention, for attachment to a different type of truck.

Referring now to FIG. 7, a second embodiment of the invention 110 is shown. This embodiment of the device 110 is identical in all respects to the embodiment 10 shown in FIGS. 1–6, except that the angle at which the top plate 140 is bent downwardly at its ends is less than that shown in FIGS. 1–6 of top plate 40, and the length of the top plate 140 is less than the length of the top plate 40. The embodiment 110 shown in FIG. 7 is specifically designed for use with a brand of truck different from that of the embodiment shown in FIGS. 1–6. More particularly, the embodiment shown in FIGS. 1–6 is designed for use with a Ford truck, whereas the embodiment shown in FIG. 7 is designed for use with a GMC truck.

Figure 8:
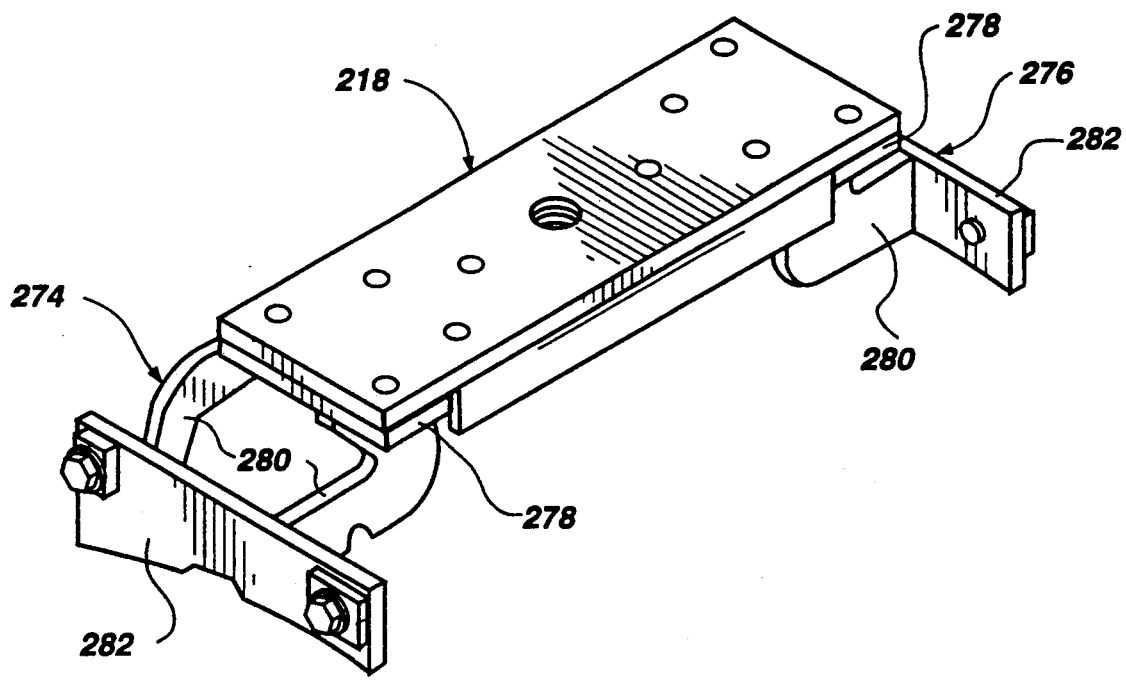
FIG. 8 is a perspective view of still another example of a ball hitch assembly according to the present invention for attachment to yet another type of truck.
Figure 9:
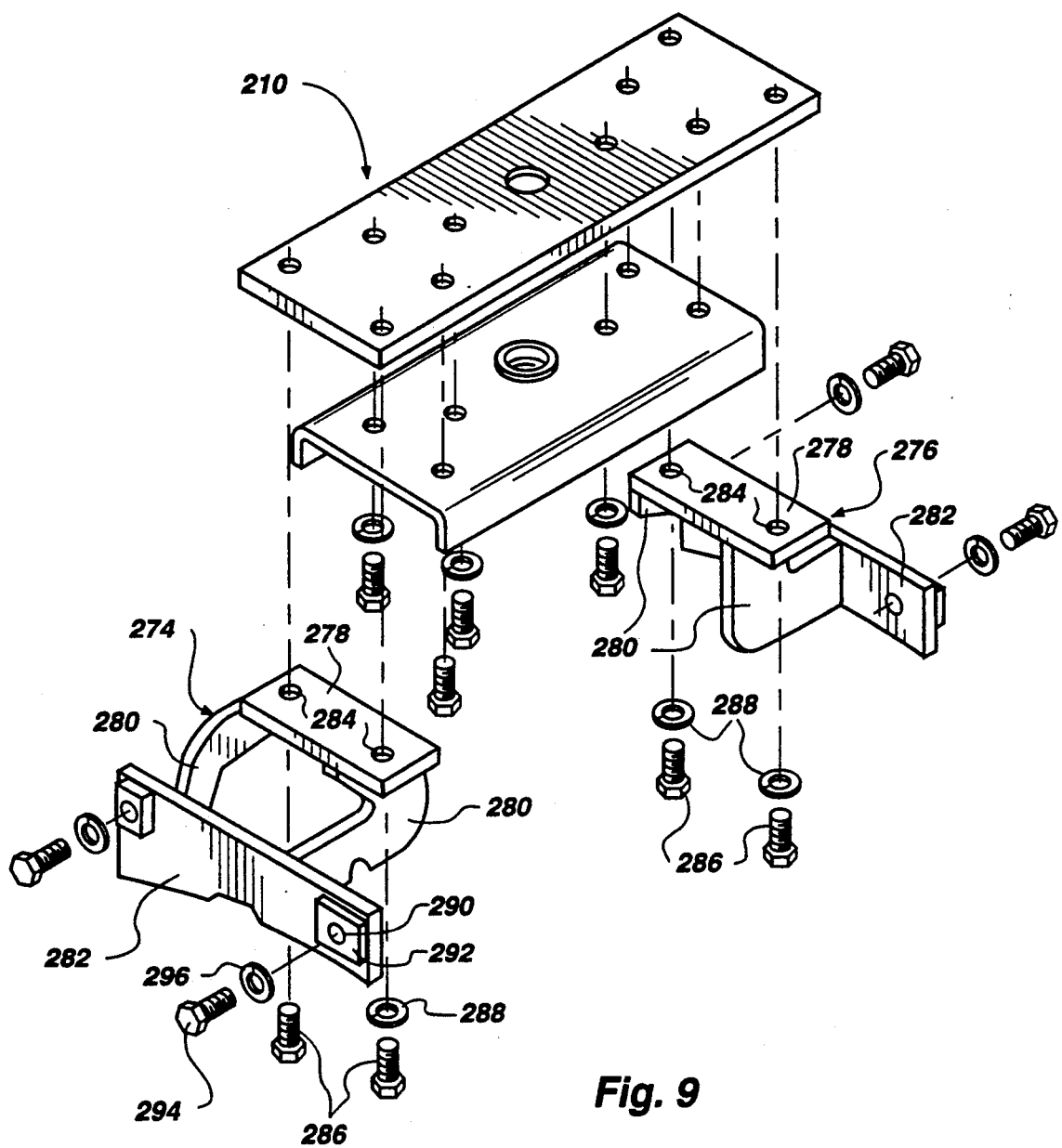
FIG. 9 is an exploded perspective view of the ball hitch assembly of FIG. 8.

Referring now to FIGS. 8 and 9, a third embodiment is shown which is specifically designed for use with Dodge trucks. The various embodiments are necessitated by different design features in the chassis of the truck to which the mounting frame is mounted.

As shown in FIGS. 8 and 9, each end of a mounting frame 218 includes a bracket portion 274 and 276. Each bracket portion 274 and 276 includes a horizontal plate 278 which attaches directly to the top plate 240, two L-shaped bracket members 280 attached at one end to the horizontal plate 278, and a vertical plate 282, to which the opposing ends of the L-shaped bracket members 280 are securely attached. The horizontal plate 278 includes a plurality of apertures 284 through which bolts 286 pass (as well as through washers 288) to secure first and second bracket portions 274 and 276 to the mounting frame 218.

Preferably, the L-shaped bracket members 280 are integrally attached by welding or other suitable means, at their respective ends to both the horizontal plate 278 and the vertical plate 282. It will be recognized that one L-shaped bracket member 280, while still generally forming an L, is reversed in configuration from the other L-shaped bracket member 280. This modification is necessitated to account for brake lines which are disposed on the chassis in all Dodge trucks.

The vertical plate 282 includes apertures 290 which are threaded and may be reinforced by small reinforcement plates 292. Appropriate bolts 294 and washers 296 attach vertical plate 282 directly to the chassis of the truck to which the device 210 is mounted. The device 210, as illustrated i FIGS. 8 and 9, is in all other respects identical to embodiments 10 and 110 described above.

Figure 10:
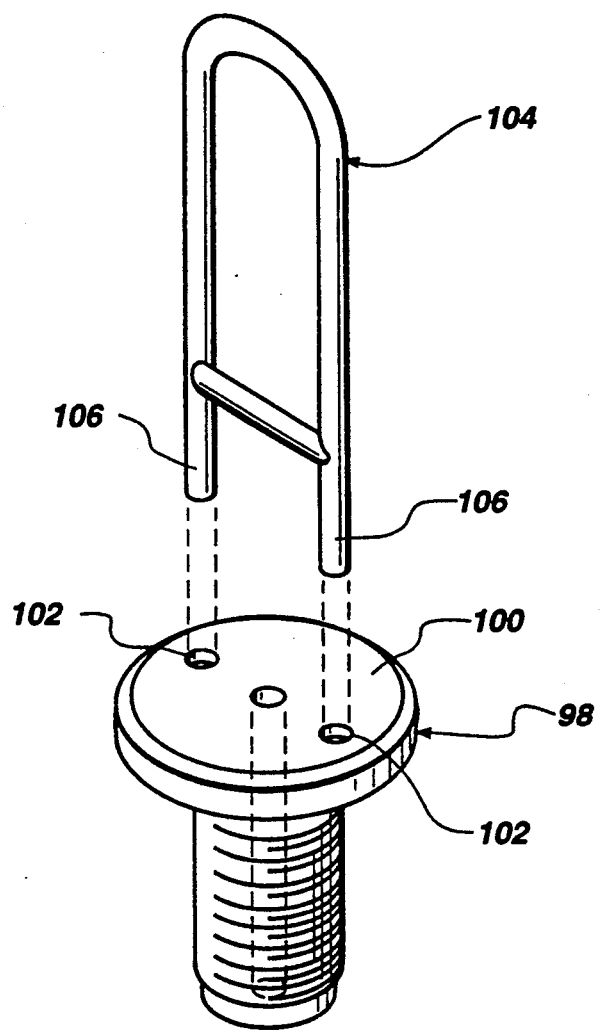
FIG. 10 is an exploded perspective view of a plug and associated wrench according to the invention for capping an aperture drilled in the truck's bed when the ball hitch is not in place.

Referring now to FIG. 10, a treaded plug 98 is shown which may be inserted into the aperture 66 when the ball hitch stem 16 has been removed therefrom. The head 100 of the threaded plug 98 includes a pair of apertures 102 disposed at opposing edges thereof. A specialty wrench 104 has free ends 106 which are aligned with and may be inserted into the apertures 102 to facilitate tightening and loosening of the threaded plug 98. Advantageously, when inserted, the head 100 of the threaded plug 98 is approximately flush with the truck bed so as to facilitate the loading of cargo.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An assembly for hitching a trailer to the chassis of a pickup truck comprising:
   a coupling hitch adapted for placement above the level of the bed of the truck;
   a shank attached to said hitch adapted for insertion through the bed of the truck;
   a stem having a first end and a second end, the first end being attached to said shank and being smaller in cross-section than said shank at the point of attachment;
   a horizontally oriented mounting plate having a first end and a second end, both of which are secured to the truck chassis beneath the bed of the truck;
   a C-channel secured to the underside of said mounting plate between the first and second ends thereof for strengthening said mounting plate;
   a first aperture disposed in said mounting plate into which the second end of said stem is adapted to be inserted;
   a second aperture disposed in said C-channel directly beneath said first aperture into which the second end of said stem is adapted to be inserted;
   means for selectively securing the second end of said stem in said first and second apertures, causing said shank, at the point of attachment of the first end of said stem, to press against the face of said mounting plate;
   said mounting plate being bent downwardly at a first point near the first end and at a second point near the second end whereby the first and second ends of said mounting plate are disposed somewhat lower than the portion of said mounting plate between the first and second points, enabling the first and second ends to attach to the chassis of a truck while the portion between the first and second points presses against the underside of the bed of the truck.

2. The apparatus of claim 1 further comprising an annular ring formed on said shank at the point of attachment to the first end of said stem whereby said shank is adapted to be locked into position against the face of said mounting plate when the second end of said stem is secured in said first and second apertures.

3. The apparatus of claim 1 further comprising a horizontally oriented triangular plate secured at its approximate center on said shank and adapted for placement above the bed of the truck, and a third aperture disposed at a corner of said triangular plate.

4. The apparatus of claim 3 wherein eh corner of the triangular plate at which the third aperture is disposed is bent upwardly to facilitate insertion of a lever into the third aperture.

5. An assembly for hitching a trailer to the chassis of a pickup truck comprising:
   a coupling hitch adapted for placement above the level of the bed of the truck;
   a shank attached to said hitch adapted for insertion through the bed of the truck;
   a stem having a first end and a second end, the first end being attached to said shank and being smaller in cross-section than said shank at the point of attachment;
   a horizontally oriented mounting plate having a first end and a second end, said mounting plate being bend downwardly at a first point near the first end and at a second point near the second end, both of which are secured to the truck chassis beneath the bed of the truck;
   a C-channel secured to the underside of said mounting plate between the first and second ends thereof for strengthening said mounting plate;
   a first aperture disposed in said mounting plate into which the second end of said stem is adapted to be inserted;
   a second aperture disposed in said C-channel directly beneath said first aperture into which the second end of said stem is adapted to be inserted;
   means for selectively securing the second end of said stem in said first and second apertures, causing said shank, at the point of attachment of the first end of said stem, to press against the face of said mounting plate;
   said C-channel having substantially the same width as said mounting plate, the arms of the C-channel depending downwardly, and wherein said C-channel has a first end and a second end, the first end being disposed adjacent to said first point at which said mounting plate is bent downwardly, and the second end being disposed adjacent to said second point at which said mounting plate is bent downwardly.

6. The apparatus of claim 5 wherein the second end of said stem is threaded, and further comprising a threaded nut mounted beneath said C-channel surrounding said second aperture, said threaded nut being adapted to receive the second end of said stem in threaded engagement.

7. The apparatus of claim 5 further comprising a ring secured to said C-channel and which lines said second aperture and extends above said C-channel, and further comprising a recess formed in said mounting plate, the recess being adapted to engage the ring when said C-channel is secured to said mounting plate.

8. The apparatus of claim 5 further comprising a first L-shaped bracket member having a first end and a second end, the first end being attached to the first end of said mounting plate, and the second end being attached to a substantially vertical plate which in turn is secured to the truck chassis.

9. The apparatus of claim 8 further comprising a second L-shaped bracket member having a first end and a second end, the first end being attached to the first end of said mounting plate, and the second end being attached to the vertical plate, the second L-shaped bracket being positioned inversely to the first L-shaped bracket.

10. The apparatus of claim 5 further comprising a plug having a head and a body adapted for insertion through the truck bed and into said first and second apertures when said shank and stem are not inserted therein, the head of said plug being substantially flush with the truck bed when inserted.

11. The apparatus of claim 10 further comprising a plurality of holes formed in the head of the plug and means for inserting or removing the plug from the truck bed by engagement with said holes.

* * * * *